Oct. 17, 1950   A. HAZELTINE   2,526,229
MAGNETOSTRICTIVE SIGNAL-TRANSLATING ARRANGEMENT
Filed Nov. 12, 1947
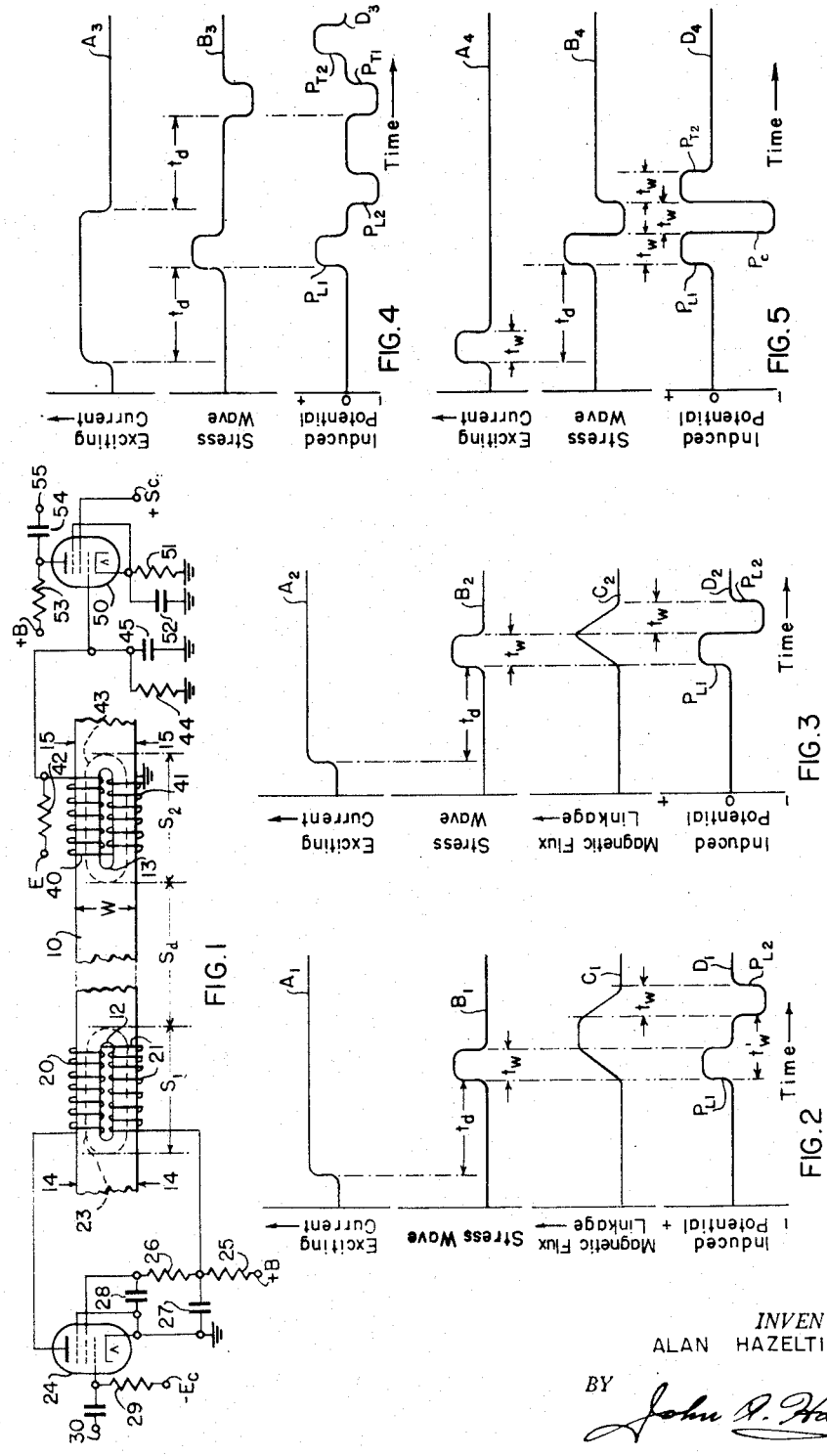
INVENTOR.
ALAN HAZELTINE
BY
John P. Harvey
ATTORNEY Patented Oct. 17, 1950

2,526,229

UNITED STATES PATENT OFFICE 2,526,229

MAGNETOSTRICTIVE SIGNAL-TRANSLATING ARRANGEMENT

Alan Hazeltine, Maplewood, N. J., assignor to Hazeltine Research, Inc., Chicago, Ill., a corporation of Illinois Application November 12, 1947, Serial No. 785,248

14 Claims. (Cl. 178—44)

1

This invention is directed to magnetostrictive signal-translating arrangements. While it may be used in translating applied signals of a variety of wave forms, including sinusoidal signals, it is especially useful for translating pulse signals with a selected time delay and will be particularly described in that connection.

It is desirable in a great many electrical systems to be able to effect an accurately selected delay in the translation of a signal pulse. In television, for example, delayed pulses may be advantageously employed to control the sensitivity of scanning circuits to free them from the adverse influence of random noise or spurious signals. In direction-finding and navigating systems elapsed times, from which navigating information may be calculated, are readily determined through the use of time-delay arrangements exhibiting a known delay characteristic. The present invention is applicable to those systems and to numerous others where it is necessary accurately to achieve a selected time delay in the translation of signal pulses.

Time-delay arrangements, per se, are already known to the art. The most frequently used one is a transmission line or a filter network including series inductance and shunt capacitance to simulate a transmission line. The delay exhibited by such lines is proportional to the square root of the product of the total series inductance and total shunt capacitance; and it is found that a bulky and expensive physical arrangement is required where a long time delay is to be obtained. Additionally, unless the line is carefully constructed and includes phase-compensation features, the shape of the delayed pulse tends to become degraded with increasing delay times.

Another time-delay apparatus known in the art comprises a rod of magnetostrictive material having a transmitting coil magnetically coupled to one portion of the rod and a receiving coil coupled to another portion suitably spaced from the transmitting coil. In that case, a pulse of exciting current applied to the transmitting coil produces through magnetostriction a mechanical or stress wave in the rod which is propagated in both directions therealong. As the stress wave passes along the portion of the rod with which the receiving coil is coupled, it is reconverted through magnetostrictive action to an induced electrical pulse which may be derived from the receiving coil. The time delay between the application of the exciting pulse and the derivation of the induced pulse is determined by the velocity of propagation of the stress wave in the magnetostrictive material and the separation of the transmitting and receiving coils. Since the velocity of propagation is relatively slow, such apparatus designed for a given delay time is less bulky and expensive than the equivalent electrical time-delay network. For this reason, the magnetostrictive apparatus appears to be attractive; but arrangements of that type as previously known and constructed do not satisfy the critical requirements necessary to obtain output signals with the sharpest slopes, the greatest amplitude, and with a minimum of distortion.

It is an object of the present invention, therefore, to provide a magnetostrictive signal-translating apparatus which avoids one or more of the limitations and disadvantages of prior arrangements employed for effecting time delays in the translation of wave signals.

It is another object of the invention to provide a magnetostrictive signal-translating arrangement critically proportioned to exhibit improved operating characteristics.

It is a further object of the invention to provide an improved magnetostrictive arrangement for translating pulse signals to obtain delayed pulses having accurately timed and sharp sloping edges.

It is a still further object of the invention to provide a magnetostrictive arrangement for translating a given electrical input pulse to obtain the strongest practical electrical output pulse with sharply defined edges.

A magnetostrictive signal-translating arrangement, in accordance with the present invention, comprises an elongated member of magnetostrictive material and an excitation winding coupled magnetically with a first section of that member. The excitation winding is effective in response to a signal applied thereto to establish a stress wave in the first section of the magnetostrictive member for propagation therealong. An induction winding is coupled magnetically to a second section of the magneostrictive member spaced from but of substantially the same length in the direction of propagation as the first-mentioned section. The induction winding is responsive to the propagation of the stress wave along the second section to derive an induced signal delayed relative to the applied signal by an interval determined by the propagation time of the stress wave between the first and second sections of the magnetostrictive member. The arrangement further includes means for establishing a polarizing magnetic flux in the second section of the magnetostrictive material to effect the response of the induction winding to the stress wave.

For a better understanding of the present invention, together with other and further objects thereof, reference is had to the following description taken in connection with the accompanying drawing, and its scope will be pointed out in the appended claims.

In the drawing, Fig. 1 is a schematic representation of a magnetostrictive signal-translating arrangement embodying the present invention; Figs. 2 and 3 comprise curves utilized in explaining the response of such an arrangement to an exciting current of step wave form; and Figs. 4 and 5 include similar curves indicating the response to a pulse of excitation current.

Referring now more particularly to Fig. 1, the arrangement there represented may be considered as one for translating applied signals of pulse wave form to derive output pulses having a precisely selected time delay relative to the applied pulses. The arrangement comprises an elongated member 10 of magnetostrictive material, such as nickel or a nickel-iron alloy, usually containing between 45 and 70 per cent. nickel and having strong magnetostrictive properties. Member 10 comprises a stack of identical laminations electrically insulated from one another and individually having a thickness very small compared with the lamination width. In Fig. 1, which is a plan view of the magnetostrictive member, the width of the laminations is designated by the dimension line W. The use of thin laminations is necessary so that the magnetic fluxes, to be discussed hereinafter, associated with the magnetostrictive conversion shall penetrate the laminations so as to make use of their full cross section. This is accomplished by having the thickness of each lamination approximately equal to twice the effective depth of magnetic-field penetration for the signals to be translated. The depth of penetration depends on the conductivity and permeability of the laminations as well as the signal frequency and may be computed in accordance with well-known formulas. The permeability here referred to is the reversible or alternating-current permeability, rather than the direct-current permeability, and the effective frequency for pulse translation may be taken as that corresponding to a period equal to twice the pulse width or duration.

The member 10 has two similar and longitudinally spaced elongated slots 12 and 13, extending transversely of the member from the top surface of the uppermost lamination through the bottom surface of the lowest lamination and spaced by a distance related to the time delay desired to be realized in the pulse translation. Preferably, the lamination width W does not exceed the length of slots 12 and 13.

The length of member 10 is not critical so long as it permits slots 12 and 13 to be formed therein with a separation sufficient to obtain the desired pulse-delay time. Each end of the member is terminated in a suitable clamp designated schematically by the arrows 14, 14 at one end and arrows 15, 15 at the other. In general, the end terminations are to suppress end reflections of the mechanical or stress wave propagated along member 10 to a tolerable value. This termination may be provided by enclosing the ends of the stack in a suitable wax, but mechanical clamps associated with resilient or sound-absorbing material are preferably used to apply a clamping pressure normal to the edges of the stacked laminations. One form of mechanical clamp is described and claimed in a copending application Serial No. 785,425, filed November 12, 1947, now Patent No. 2,455,740, issued December 7, 1948, in the name of Leslie F. Curtis, and assigned to the same assignee as the present invention.

An excitation winding is coupled magnetically with a first section of member 10 and is effective in response to an applied signal pulse or excitation current pulse to establish a stress wave in that section for propagation along the magnetostrictive member. The excitation winding includes two series-connected coils 20 and 21, the coil 20 being threaded through the slot 12 and around one side of member 10 while coil 21 is threaded through the slot 12 and around the opposite side of member 10. Coils 20 and 21 are connected in series with such polarity that their currents tend to produce magnetic fluxes in opposite directions so that the resultant flux has a local path designated by the broken line 23. The portion of member 10 which is primarily subject to the magnetizing effect of the exciting winding is the section designated by dimension line $S_1$. An advantage in terminating undesired electrical oscillations, especially when translating short pulses having a duration of one microsecond or less, is obtained by having the excitation winding 20, 21 resonant at a frequency corresponding to a period approximately equal to, or of the order of, twice the duration of the signal pulse to be translated.

A pulse-translating circuit including the excitation winding 20, 21 comprises means for supplying a pulse of excitation current to that winding. As shown, this circuit comprises a pentode vacuum tube 24 having a grounded cathode and having an anode connected through the excitation winding and a decoupling resistor 25 to a source of space current indicated +B. The suppressor electrode of tube 24 is directly connected with its cathode and the screen electrode is connected through a voltage-dropping resistor 26 and resistor 25 to the source +B. Condensers 27 and 28 are by-pass condensers for further decoupling the anode and screen electrodes, respectively, from each other and from the source +B. A bias source —$E_c$ is connected to the control electrode of the tube 24 through a grid resistor 29 and maintains the tube near or below anode-current cutoff in the absence of applied signals. The direct-current component of the anode-current pulses traverses the excitation winding 20, 21 and is usually sufficient to establish a suitable value of polarizing magnetic flux in the section $S_1$ of the magnetostrictive member 10. If desired, an additional direct current may be fed to this winding for polarizing purposes and may be obtained by having tube 24 normally slightly conductive. An input terminal 30 provides means for supplying to the input circuit of the tube 24 pulses to be translated thereby.

An induction winding is coupled magnetically to a second section $S_2$ of the magnetostrictive member 10, this second section being spaced from the first section $S_1$ by a distance related to the desired time delay to be introduced in the signal translation. The induction winding includes two series-connected coils 40 and 41 which are poled and arranged relative to slot 13 of member 10 in the same manner as the arrangement of coils 20 and 21 of the excitation winding relative to slot 12. Preferably, the induction winding has substantially no direct magnetic coupling with the excitation winding so that the former is responsive primarily only to the propagation of a stress wave along the second section $S_2$ of member 10 to derive an induced signal for application to a utilizing circuit. Direct magnetic coupling between the excitation and induction windings is very small because of the opposition of the coils 20, 21 and also of the coils 40, 41. Other couplings may be minimized by the use of well-known shielding arrangements surrounding those windings and by providing adequate electrical insulation between the several laminations of the stack to avoid the introduction of circulating currents. In the above-mentioned copending application of Leslie F. Curtis, there is described a coupler assembly, including pole shoes and shielding arrangements for a winding, which is especially useful in minimizing direct magnetic coupling between the excitation and induction windings. Since the present invention is not limited to apparatus in which the magnetic flux path is completed entirely within the magnetostrictive member 10 but is also useful where that path is completed outside of the magnetostrictive member, the coupler assemblies of the Curtis application may be advantageously employed in apparatus constructed in accordance with the present invention.

The induction winding 40, 41 may be self-resonant at the same frequency as the excitation winding and is associated with means for establishing a polarizing magnetic flux in the section $S_2$ of the magnetostrictive member to effect the response of the induction winding to a stress wave propagated along that section. The polarizing means for the illustrated embodiment of the invention comprises a source of unidirectional potential, indicated as E, and a resistor 42 connected in a direct-current circuit with the induction winding 40, 41. This circuit provides a local magnetization in section $S_2$ of member 10 as designated by the broken line 43. A wave-shaping network including a damping resistor 44 and a parallel-connected condenser 45 is connected across the induction winding 40, 41. The wave-shaping network 44, 45 reduces the amplitude of electrical oscillations or ringing effects in the induction winding. The input electrodes of a wave-signal repeater including a pentode vacuum tube 50 are connected across the induction winding so that this repeater constitutes means coupled to the winding for supplying the induced signal to a utilizing device. The cathode of tube 50 is grounded through a resistor 51 which is by-passed by a condenser 52. The anode of tube 50 is connected to a source of space current +B through an anode load resistor 53 and a condenser 54 couples an output terminal 55 to the anode circuit of the tube.

The operation of the described arrangement will be considered initially with reference to the series of curves of Fig. 2, representing the response to an exciting current of step wave form shown in curve $A_1$ and denoting current flow in excitation winding 20, 21 following the application to input terminal 30 of a control signal of the same wave form. The flow of exciting current through winding 20, 21 varies the flux in the local section $S_1$ of the member 10 and establishes in that section a longitudinal mechanical stress, such as a contraction. This stress creates two similar longitudinal stress waves or mechanical wave pulses which travel in opposite directions along the longitudinal axis of member 10 with a velocity of propagation in accordance with the following expression:

$$V = \left(\frac{E}{\rho}\right)^{1/2} \quad (1)$$

where,

V = the velocity in meters per second;
E = the Young's modulus for member 10 in newtons per square meter;
$\rho$ = the density of member 10 in kilograms per cubic meter.

With usual magnetostrictive materials, the velocity of propagation is of the order of 4500 meters per second.

The stress wave traveling in the direction of the end clamp 14, 14 is effectively suppressed at the end termination and is not used. The stress wave represented by curve $B_1$ which travels in the direction of induction winding 40, 41 is the useful one. Its leading edge originates at the right-hand end of section $S_1$ of member 10 while its trailing edge originates at the left-hand or opposite end of that section. Therefore, the length of the stress wave along the member 10 at any instant is equal to the length of section $S_1$ measured in the direction of propagation. The duration of the stress wave or its pulse width is expressed by the relation:

$$t_w = \frac{S_1}{V} \quad (2)$$

and is in seconds if the section length is in meters. The stress wave arrives at the second section $S_2$ of member 10 in the time:

$$t_d = \frac{S_d}{V} \quad (3)$$

where, $S_d$ = the length in meters of member 10 between the adjacent end portions of the sections $S_1$ and $S_2$.

The time $t_d$ determines the time delay of the response of induction winding 40, 41 to the excitation step current applied to excitation winding 20, 21 and it is found that the value of the velocity of propagation given above results in convenient dimensions of the member 10 for pulse widths of the order of 1 microsecond and for delay times of the order to 10 to 100 microseconds.

The stress wave, represented by curve $B_1$, modifies the permeability of section $S_2$. It thus changes the flux established in that section by the polarizing circuit and does so as soon as the leading edge of the stress wave arrives at the left-hand end of that section. As represented by curve $C_1$, the flux linkage with the induction winding 40, 41 continues to change until the trailing edge of the stress wave reaches the left-hand end of section $S_2$. In order to demonstrate the need for critical proportioning within the apparatus, it will be assumed that the length of section $S_2$ measured in the direction of stress-wave propagation exceeds that of the first section $S_1$. Upon that assumption, the magnetic flux linkage with induction winding 40, 41 remains constant thereafter until the leading edge of the stress wave reaches the right-hand end of section $S_2$, after which it falls toward its initial value as the trailing edge thereof travels through the remainder of the section. The magnitude of the induced signal voltage of induction winding 40, 41 varies with the rate of change of the flux and thus consists of two pulse components of opposite polarity, designated $P_{L1}$ and $P_{L2}$ in curve $D_1$. These pulse components are of the same duration $t_w$ as the stress wave and their leading edges have a time separation $t_w'$ in accordance with the following expression:

$$t_w' = \frac{S_2}{V} \quad (4)$$

where, $S_2$ = the length in meters of the section $S_2$ measured in the direction of propagation.

This induced signal is applied to the input electrodes of repeater 50 and after translation thereby is supplied to output terminal 55.

In most applications of time-delay apparatus of the type under consideration, it is highly desirable that the output potential pulse to be supplied to a utilizing apparatus have a sharp leading edge; that is, that the pulse should pass rapidly through a zero value of signal potential. This sharpening of the pulse edge may be attained without loss in pulse width or amplitude by constructing the apparatus so that the sections $S_1$ and $S_2$ of the magnetostrictive member, which sections are primarily influenced by the respective excitation winding and the induction winding, have the same length as measured in the direction of propagation. Where this critical proportioning is satisfied, the response to an excitation current of step wave form supplied to excitation winding 20, 21 is represented by the curves of Fig. 3.

These curves are generally similar to those of Fig. 2 and corresponding ones are identified by related reference characters. Curve $D_2$ shows that the negative pulse component of the signal induced in induction winding 40, 41 follows immediately the positive component $P_{L1}$ and consequently that the leading edge of the negative component passes very rapidly through zero. This, then, is the component which is utilized by suitable apparatus connected with output terminal 55. The useful pulse $P_{L2}$ not only has a very sharp leading edge but also represents a precisely fixed, selected time delay relative to the leading edge of the exciting current. This delay time is equal to the delay $t_d$ of propagation through the intermediate section $S_d$ of member 10 plus the pulse width $t_w$.

If the exciting current is of pulse wave form, as represented by curve $A_3$ of Fig. 4, the stress wave established in section $S_1$ of member 10 has two components of equal duration. They correspond to the leading and trailing edges of the applied pulse but are of opposite polarity, as shown in curve $B_3$, because one edge of the exciting pulse effects a contraction within section $S_1$ while the other produces an expansion. Assuming once again that the second section $S_2$ is longer than the first section $S_1$, the resulting signal induced in induction winding 40, 41 is shown by curve $D_3$. A first pair of pulses having opposite polarity and indicated $P_{L1}$ and $P_{L2}$ is induced in the induction winding 40, 41 by the first or leading stress-wave component while the second pair of pulse components $P_{T1}$ and $P_{T2}$ is induced by the trailing stress-wave component. This output signal may be ambiguous because of the paired pulses of like polarity and further does not have the sharp leading edges oftentimes desired.

To secure the strongest output pulse with the sharpest leading and trailing edges, the lengths of sections $S_1$ and $S_2$ should be the same and the duration of the excitation current pulse should be made equal to the duration $t_w$ of each component of the stress wave propagated along member 10. In other words, the input excitation current pulse to winding 20, 21 should have the same width as the desired output potential pulse and this in turn determines the effective length of the sections $S_1$ and $S_2$. The condition is satisfied by having the length of those sections represent a propagation time equal to the duration of the excitation current pulse.

The curves of Fig. 5 represent the response of the arrangement to a current pulse applied to excitation winding 20, 21 when the sections $S_1$ and $S_2$ are of equal lengths and the pulse of excitation current has a duration equal to that of the stress wave. For this case the excitation pulse, represented by curve $A_4$, establishes the stress wave of curve $B_4$ which is propagated along member 10 to induce in induction winding 40, 41 the potential signal of curve $D_4$. The pulse component $P_c$ has very sharp leading and trailing edges and is preceded and followed by pulses of opposite polarity but of approximately half amplitude. The component $P_c$ has an increased amplitude because it represents an interval in which the magnetostrictive conversion effects of the leading and trailing components of the stress wave propagated along member 10 augment one another in induction winding 40, 41. It is this component $P_c$ which is utilized by apparatus coupled with the output terminal 55.

It may be convenient in utilizing the described output signal of curve $D_4$ to follow the repeater 50 with an amplitude limiter which suppresses the amplitude of the pulse components $P_{L1}$ and $P_{T2}$ and translates only the component $P_c$ desired to be supplied to a utilizing device. Alternatively, the polarity of the polarizing circuit of induction winding 40, 41 may be reversed in which case the polarity of the output signal of curve $D_4$ is also reversed. It is then practical to operate repeater 50 as a limiter supplying to output terminal 55 only the desired component $P_c$.

The expressions "first section" and "second section" as used in the appended claims are intended to mean those portions of member 10 which are primarily influenced by and subjected to the magnetic flux of the exciting and induction windings, respectively. Also, the expression "opposite polarity" used in discussing the operation of the arrangements is intended to mean opposite sense rather than any absolute polarity. Further, the term "elongated member of magnetostrictive material" is used to mean a member in which the dimension along which stress-wave propagation takes place is the longest dimension whether it be a linear or curvilinear path.

The described arrangement, constructed to satisfy the operating conditions recited in connection with the curves of Fig. 5, ensures the optimum response of such a magnetostrictive signal-translating apparatus to an exciting pulse of given amplitude and given pulse duration to provide output signals of the largest practical amplitude and with the sharpest leading and trailing edges. The time delay of the output signal is determined by the properties of the magnetostrictive material and may be accurately selected to a desired value. The arrangement has the distinct advantage over electrical time-delay systems that the wave form of the output potential pulse is substantially independent of the selected value of delay and is an improvement over previously proposed magnetostrictive arrangements in that the output potential pulses have very sharp leading and trailing edges as well as a maximum practical amplitude.

The wave forms representing the response of the arrangement are idealized and in practice it is found that the pulse components of the output signal are more rounded and may be accompanied by damped oscillations. However, any such oscillations have a small amplitude compared with the desired output pulse P_c and have been omitted in an effort to simplify the theoretical discussion of the magnetostrictive conversion.

As previously explained, the thickness of each lamination of the magnetostrictive member is selected relative to the depth of penetration. Usually, a thickness of the order of 1 to 5 thousandths of an inch is adequate for the translation of pulses having a duration of 1 microsecond. The small thicknesses are used where little damping is desired and the larger thicknesses are useful in rapidly terminating oscillation that may tend to follow the desired pulses due to the natural capacitances shunting the excitation and induction windings. A laminated magnetostrictive structure is beneficial when it is necessary to use magnetostrictive elements which are very thin. The use of a stack of laminations increases the amplitude of the output pulse; however, it has been found that a single lamination may supply a usable output signal as specifically described and claimed in a copending application of Theodore J. Fister, Serial No. 785,313, filed November 12, 1947, now abandoned, and assigned to the same assignee as the present invention.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A magnetostrictive signal-translating arrangement comprising: an elongated member of magnetostrictive material; an excitation winding coupled magnetically with a first section of said member and effective in response to a signal applied to said winding to establish a stress wave in said section for propagation along said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections; and means for establishing a polarizing magnetic flux in said second section to effect said response of said induction winding to said stress wave.

2. A magnetostrictive signal-translating arrangement comprising: an elongated member of magnetostrictive material; an excitation winding coupled magnetically with a first section of said member and effective in response to a signal applied to said winding to establish a stress wave in said section for propagation along said member; an induction winding coupled magnetically to a second section of said member spaced from but of substantially the same length in the direction of propagation as said first section, having substantially no direct magnetic coupling with said excitation winding, and responsive primarily only to the propagation of said stress wave along said second section to derive an induced signal delayed relative to the applied signal by an interval determined by the propagation time of said stress wave between said first and said second sections; and means for establishing a polarizing magnetic flux in said second section to effect said response of said induction winding to said stress wave.

3. A magnetostrictive signal-translating arrangement comprising: an elongated member including at least one element of magnetostrictive material having a thickness approximately equal to twice the effective depth of magnetic-field penetration for signals to be translated; an excitation winding coupled magnetically with a first section of said member and effective in response to a signal applied to said winding to establish a stress wave in said section for propagation along said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections; and means for establishing a polarizing magnetic flux in said second section to effect said response of said induction winding to said stress wave.

4. A magnetostrictive signal-translating arrangement comprising: an elongated member of magnetostrictive material; an excitation winding coupled magnetically with a first section of said member and effective in response to a signal applied to said winding to establish a stress wave in said section for propagation along said members; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections; and a direct-current circuit including said induction winding and a potential source for establishing a polarizing magnetic flux in said second section to effect said response of said induction winding to said stress wave.

5. A magnetostrictive pulse-translating arrangement comprising: an elongated member of magnetostrictive material; a tuned excitation winding, resonant at a frequency corresponding to a period approximately equal to twice the duration of a signal pulse to be translated, coupled magnetically with a first section of said member and effective in response to a pulse applied to said winding to establish a stress wave in said section for propagation along said member; a tuned induction winding, resonant at substantially the same frequency as said excitation winding, coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

6. A magnetostrictive pulse-translating arrangement comprising: an elongated member of magnetostrictive material; a tuned excitation winding, self-resonant at a frequency corresponding to a period approximately equal to twice the duration of a signal pulse to be translated, coupled magnetically with a first section of said member and effective in response to a pulse applied to said winding to establish a stress wave in said section for propagation along said member; a tuned induction winding, self-resonant at substantially the same frequency as said excitation winding, coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

7. A magnetostrictive pulse-translating arrangement comprising: an elongated member of magnetostrictive material; an excitation winding coupled magnetically with a first section of said member and effective in response to a pulse applied to said winding to establish in said first section a stress wave for propagation along said member having pulse components individually having a duration equal to that of the applied pulse; an induction winding coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

8. A magnetostrictive arrangement for translating a pulse signal of a given pulse duration comprising: an elongated member of magnetostrictive material; an excitation winding coupled magnetically with a first section of said member having an effective length representing a propagation time equal to the duration of said pulse, said winding being effective in response to said pulse to establish a stress wave in said section for propagation along said member; an induction winding coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

9. A magnetostrictive arrangement for translating a pulse signal of a given pulse duration comprising: an elongated member of magnetostrictive material; an excitation winding coupled magnetically with a first section of said member having an effective length representing a propagation time equal to the duration of said pulse, said winding being effective in response to said pulse to establish a stress wave in said section for propagation along said member; a pulse-translating circuit including said winding for supplying a pulse of excitation current of said given pulse duration thereto; an induction winding coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

10. A magnetostrictive arrangement for translating a pulse signal of a given pulse duration comprising: an elongated member of magnetostrictive material; an excitation winding coupled magnetically with a first section of said member having an effective length representing a propagation time equal to the duration of said pulse, said winding being effective in response to said pulse to establish a stress wave in said section for propagation along said member; a pulse-translating circuit including said winding for supplying a component of direct current thereto to establish a polarizing magnetic flux in said section and for supplying a pulse of excitation current of said given pulse duration to said winding to create said stress wave in said section; an induction winding coupled magnetically to a second section of said member spaced from but of substantially the same length in the direction of propagation as said first section and responsive to the propagation of said stress wave along said second section to derive an induced signal delayed relative to the applied pulse by an interval determined by the propagation time of said stress wave between said first and said second sections; and means for establishing a polarizing magnetic flux in said second section to effect said response of said induction winding to said stress wave.

11. A magnetostrictive signal-translating arrangement comprising: an elongated member of magnetostrictive material comprising a stack of laminations electrically insulated from one another and individually having a thickness approximately equal to twice the effective depth of penetration of signals to be translated; an excitation winding coupled magnetically with a first section of said member and effective in response to a signal applied to said winding to establish a stress wave in said section for propagation along said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections; and means for establishing a polarizing magnetic flux in said second section to effect said response of said induction winding to said stress wave.

12. A magnetostrictive signal-translating arrangement comprising: an elongated member of magnetostrictive material comprising a stack of laminations insulated from one another and individually having a thickness within the range of 0.001 to 0.005 inch; an excitation winding coupled magnetically with a first section of said member and effective in response to a signal applied to said winding to establish a stress wave in said section for propagation along said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections; and means for establishing a polarizing magnetic flux in said second section to effect said response of said induction winding to said stress wave.

13. A magnetostrictive signal-translating arrangement comprising: an elongated member of magnetostrictive material having two similar and longitudinally spaced elongated slots; an excitation winding coupled magnetically with a first section of said member and effective in response to a signal applied to said winding to establish a stress wave in said section for propagation along said member, said winding including two series-connected coils one of which is threaded through one of said slots and around one side of said member while the other is threaded through said one slot and around the opposite side of said member and said coils being poled to produce magnetic fluxes in opposite directions in said section of said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave betwen said first and said second sections, said induction winding including two series-connected coils poled and arranged relative to the other of said slots in a manner similar to the arrangement of said coils of said exciting winding relative to said one slot; and means for establishing a polarizing magnetic flux in said second section to effect said response of said induction winding to said stress wave.

14. A magnetostrictive signal-translating arrangement comprising: an elongated member of magnetostrictive material having two similar and longitudinally spaced elongated slots and having a width not substantially exceeding the length of said slots; an excitation winding coupled magnetically with a first section of said member and effective in response to a signal applied to said winding to establish a stress wave in said section for propagation along said member, said winding including two series-connected coils one of which is threaded through one of said slots and around one side of said member while the other is threaded through said one slot and around the opposite side of said member and said coils being poled to produce magnetic fluxes in opposite directions in said section of said member; an induction winding coupled magnetically to a second section of said member spaced from but of substantially the same length in the direction of propagation as said first section and responsive to the propagation of said stress wave along said second section to derive an induced signal delayed relative to the applied signal by an interval determined by the propagation time of said stress wave between said first and said second sections, said induction winding including two series-connected coils poled and arranged relative to the other of said slots in a manner similar to the arrangement of said coils of said exciting winding relative to said one slot; and means for establishing a polarizing magnetic flux in said second section to effect said response of said induction winding to said stress wave.

ALAN HAZELTINE.

REFERENCES CITED

The following references are of record in the file of this patent:

UNITED STATES PATENTS

| Number | Name | Date |
| --- | --- | --- |
| 2,059,107 | Hinton | Oct. 27, 1936 |
| 2,166,359 | Lakatos | July 18, 1939 |
| 2,318,417 | Phelps | May 4, 1943 |
| 2,328,496 | Rocard | Aug. 31, 1943 |
| 2,401,094 | Nicholson | May 28, 1946 |
| 2,433,337 | Bozorth | Dec. 30, 1947 |